United States Patent
Cook et al.

(10) Patent No.: US 7,082,835 B2
(45) Date of Patent: Aug. 1, 2006

(54) PRESSURE SENSOR APPARATUS AND METHOD

(75) Inventors: James D. Cook, Freeport, IL (US);
Kenneth E. Gall, Rock City, IL (US);
Kundan L. Malik, Rockford, IL (US);
Brian J. Marsh, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/465,202

(22) Filed: Jun. 18, 2003

(65) Prior Publication Data

US 2004/0255681 A1 Dec. 23, 2004

(51) Int. Cl.
*H01L 27/14* (2006.01)

(52) U.S. Cl. .............................. 73/715; 73/756; 310/313
(58) Field of Classification Search .................. 73/700, 73/715, 717, 754, 727
See application file for complete search history.

(56) References Cited

U.S. PATENT DOCUMENTS

| | | | | |
|---|---|---|---|---|
| 4,454,440 A | | 6/1984 | Cullen | 310/313 R |
| 4,739,381 A | * | 4/1988 | Miura et al. | 257/417 |
| 4,771,639 A | * | 9/1988 | Saigusa et al. | 73/727 |
| 5,471,723 A | | 12/1995 | Luder et al. | 29/25.41 |
| 5,625,151 A | * | 4/1997 | Yamaguchi | 73/716 |
| 5,635,649 A | * | 6/1997 | Tobita et al. | 73/717 |
| 5,852,230 A | * | 12/1998 | Selby et al. | 73/54.35 |
| 6,066,882 A | * | 5/2000 | Kato | 257/414 |
| 6,229,190 B1 | * | 5/2001 | Bryzek et al. | 257/419 |
| 6,374,678 B1 | | 4/2002 | Masuda | 73/706 |
| 6,462,698 B1 | | 10/2002 | Campbell et al. | 342/51 |
| 6,541,893 B1 | | 4/2003 | Zhu et al. | 310/313 |
| 6,550,337 B1 | | 4/2003 | Wagner et al. | 73/715 |

OTHER PUBLICATIONS

PCT Notification of the International Search Report and the Written Opinion of the International Searching Authority or the Declaration, Date of Mailing Oct. 11, 2004.

* cited by examiner

*Primary Examiner*—Edward Lefkowitz
*Assistant Examiner*—Andre Allen
(74) *Attorney, Agent, or Firm*—Luis M. Ortis

(57) ABSTRACT

A pressure sensor apparatus is disclosed herein, which generally includes a sensor element, a flexible sensor diaphragm in intimate contact with the sensor element at all pressure levels and temperatures, and a package base and a package cover for hermetically sealing the sensor element and the flexible sensor diaphragm within a hermetically sealed sensor package to provide pressure sensor data thereof. The sensor element can be implemented as a quartz sense element to produce a SAW pressures sensor. The pressure sensor apparatus can be alternatively based on other sensing technologies, such as silicon piezoresistive, ceramic capacitive and others.

15 Claims, 6 Drawing Sheets

(Section A-A)

(DETAIL B)

PRESSURE SENSOR APPARATUS AND METHOD

TECHNICAL FIELD

The present invention is generally related to pressure sensing methods and systems. The present invention is additionally related to tire pressure sensors utilized in automotive, heavy-duty vehicles, and similar commercial markets. The present invention is specifically related to a wireless tire pressure monitoring system (TPMS).

BACKGROUND OF THE INVENTION

Various sensors are known in the pressure sensing arts. In particular, many different techniques have been proposed for sensing the pressure in tires and for delivering this information to the operator at a central location on the vehicle so that he knows that a tire is at low or high air pressure.

Such pressure sensors generally communicate with the vehicle so that the sensed pressure is displayed to the operator when the vehicle is moving, i.e. the wheel rotating relative to the body of the vehicle. Such devices are generally relatively complex and expensive or alternatively are not particularly robust.

Some tire pressure sensor systems incorporate a sensor that is fixed to the body so no rotating electrical contact between the rotating wheel and the chassis is required. In this system, a sensor rod is deflected by contact with the tire sidewall when the sidewall of the tire is deformed as occurs when the tire pressure is low. This system provides an indication of low tire pressure but is not robust. For example mud or other debris on the wheels may cause faulty readings. Furthermore, this system provides an indication only when the tire pressure is reduced significantly as is necessary for significant tire bulge to occur. Clearly such a system simply cannot provide a reading of actual tire pressure.

In another form of a fixed sensor, the height of the vehicle can be detected and when the height is reduced, it is deemed tire pressure is low. However, if the tire in a rut or is parked on uneven ground, a faulty low-pressure reading is likely to be generated.

More complicated systems are capable of monitoring tire pressure. For example, some pressure sensor systems utilize a rotating encoder formed by a multipolar ring of magnetic segments of different polarity that are distributed circumferentially in a regular and alternating manner. A transmitter coil coaxial with the ring and a fixed pickup (an induction coil system) is energized by alternating electrical current flowing through the transmitter coil to generate a magnetic field superimposed on the magnetic field created by the multipolar ring generates a signal picked up and delivers a signal relating the rotating characteristic of the wheel and thus, the state of the tire.

Some tire pressure systems also utilize a wheel system wherein each sensor on each wheel is provided with a radio transmitter that transmit the information on tire pressure, etc. from the wheel to a radio receiver on the body of the vehicle and this transmitted signal is decoded to provide information on tire pressure etc. and makes it available to the operator. Conventional wireless systems, however, are not durable and are expensive to design and produce.

Based on the foregoing it can be appreciated that a need exists for an improved compact tire pressure design that includes wireless sensing capabilities, while implemented via a practical and low cost design solution, which is not available in present tire pressure sensing systems and devices.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide an improved sensor apparatus and method.

It is another aspect of the present invention to provide for a sensor apparatus and method for use in tire pressure sensing applications.

It is a further aspect of the present invention to provide an improved pressure sensor apparatus.

It is an additional aspect of the present invention to provide a pressure sensor apparatus, which can be utilized as a component of a wireless pressure monitoring system (TPMS).

The aforementioned aspects of the invention and other objectives and advantages can now be achieved as described herein. A pressure sensor apparatus is disclosed herein, which can include a SAW sensor element, such as, for example, a SAW sensor element (e.g., a quartz sense element). The sensor element can also be implemented as another type of sensor element, such as, for example, silicon piezoresistive or ceramic capacitive sensor elements. The apparatus can also include a flexible sensor diaphragm in intimate contact with the sensor element at all pressure levels and temperatures, and a package base and a package cover for hermetically sealing the sensor element and the flexible sensor diaphragm within a hermetically sealed sensor package to provide pressure sensor data thereof.

In general, the sensor element and the flexible sensor diaphragm can be pre-assembled within the hermetically sealed sensor package to shift an output frequency of the hermetically sealed sensor package a known amount to thereby ensure contact between the sensor element and the flexible sensor diaphragm. Additionally, a dimple can be formed in the center of the flexible sensor diaphragm, which in turn contacts, a flat surface of the sensor element.

Also, an antenna can be implemented, which provides the pressure sensor data wirelessly from the hermetically sealed sensor package. A flex circuit interconnect can be located between the sensor element the antenna. The package cover and the package base can be each formed from stainless steel, such as, for example, a stainless steel 17-7 PH material. Finally, the hermetically sealed sensor package can be adapted for use in measuring pressure and temperature within a vehicle tire.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

The invention described herein can be implemented, in accordance with one possible embodiment, as a product in a component in a wireless tire pressure monitoring system (TPMS). Such an embodiment can be configured as a small-size device, which is also lightweight and based on battery-less operation. The pressure sensor described herein does not consume power when implemented in the context of a TPMS operation. Thus, the present invention can be embodied in a practical and low cost design solution. Such a design can be mass-produced for automotive, heavy-duty vehicles, and commercial markets.

In accordance with one embodiment of the present invention, the pressure sensor described herein can be implemented as a SAW (surface acoustic wave) pressure sensor that includes a quartz sense element, a package base, and a flexible diaphragm. For the pressure sensor to achieve the application accuracy required, the pressure sensitive diaphragm must be in intimate contact with the quartz sense element at all pressure levels and temperatures. To compensate for thermal expansion of the packaging materials (i.e., base and cover), the SAW sense element (i.e., quartz sense element) and the sensor diaphragm are preferably preloaded when they are assembled in order to shift the output frequency a known amount to ensure contact at all times.

A dimple can be formed in the center of the pressure sensor diaphragm portion of the cover during its manufacture. The dimple contacts a flat surface of the quartz sense element. In general, the pressure sensor can be embodied as a small, circular element. The design configuration is generally implemented as small, circular, hermetically sealed button package. Example dimensions include approximately 12 mm in diameter and approximately 2 mm thick. It can be of course be appreciated by those skilled in the art that such dimensions are discussed herein for illustrative purposes only, and are not considered limiting features of the present invention. Pressure sensor dimensions may vary, depending on the needs and use of such a device.

The design of the cover and base are such that it generally allows for the reduction of assembly tolerances. The sensor material of the base and cover can be formed from stainless steel 17-7 PH. The advantages of such a material are discussed in greater detail herein. The pressure sensor can also be configured in association with an interface design board. For example, a PCB or flex circuit interconnect can be located between the pressure sensor button package and one or more antennas thereof for the transmission and receipt of wireless data.

Figure 1:
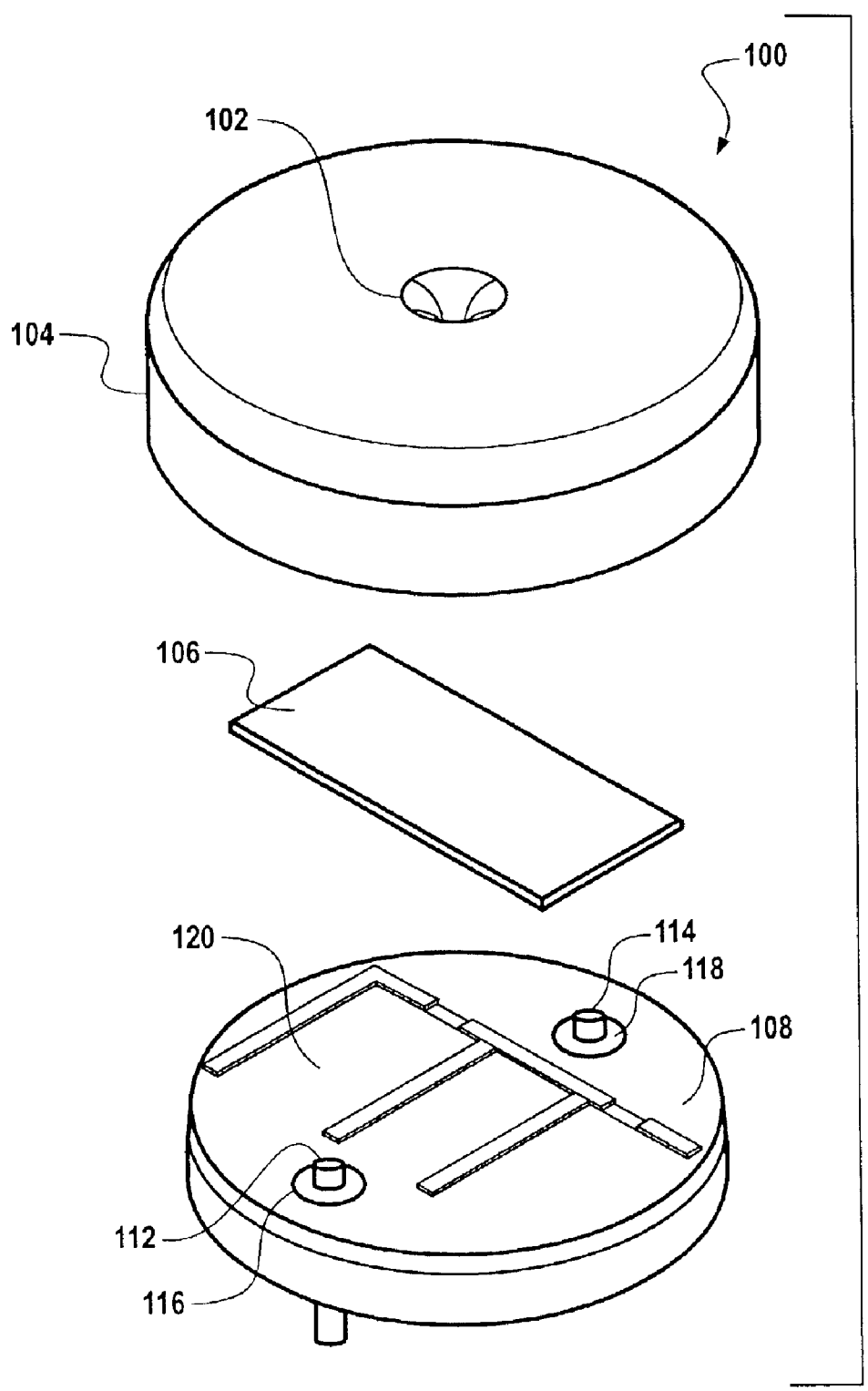
FIG. 1 illustrates an exploded view of a sensor apparatus, which can be implemented in accordance with a preferred embodiment of the present invention.

FIG. 1 illustrates an exploded view of a pressure sensor 100, which can be implemented in accordance with a preferred embodiment of the present invention. Pressure sensor 100 generally includes a package cover 104 that includes a dimple 102 formed at the center of cover 104. Pressure sensor 100 can be implemented as a SAW pressure sensor that includes a quartz sense element 106 (e.g., a SAW chip), and a package base 108.

Additionally, one or mounting pins 112 and 114 can be utilized for maintaining quartz sense element 106 within a hermetically sealed sensor package thereof. Base 108 includes a base portion 120, which is recessed into base 108 and in which quartz sense element 106 can rest. The hermetically sealed sensor package can be formed in a small shape that is both thin and circular and which is adaptable for use in measuring pressure and temperature.

It can be appreciated by those skilled in the art, however, that other types of pressure sensors can be implemented in accordance with alternative embodiments of the present invention. Pressure sensor 100 can be alternatively implemented as, for example, a silicon piezoresistive or ceramic pressure sensor. In such alternative embodiments, the quartz sense element 106 would be replaced respectively with silicon piezoresistive or ceramic capacitive sensor elements.

Cover 102 of FIG. 1 can be formed from a stainless steel, such as, for example, a stainless steel 17-7 PH material. Cover 102 can be initially formed from a flat sheet stock that is approximately 0.50 mm thick material in a solution annealed condition. The cover can next be stamped into a circular shape, and deep drawn into a cup configuration. Next, dimple 102 can be formed into the center of cover 104, such that dimple 102 is formed approximately 0.6 mm deep into cover 104. It can be of course be appreciated by those skilled in the art that such dimensions are discussed herein for illustrative purposes only, and are not considered limiting features of the present invention. The dimensions of cover 104 may vary, depending on the needs and use of such a device.

Base 108 can also be formed from a stainless steel such as a stainless steel 17-7 PH material. Stamping approximately 2 mm thick material in the solution annealed condition into a circular disk can form base 108. Such a disk can be formed so that two small saddles (i.e., mounting pins 112 and 114) are protruding from base 108 for which the pressure sensor chip (e.g.,., quartz sense element 106) will rest. Holes 116 and 118 can thus be punched into base 108 to facilitate glass to metal seals thereof. Hole 116 is associated with mounting pin 112, while hole 118 is associated with mounting pin 114.

The glass to metal seal process for the mounting pins and hardening process for the 17-7 PH stainless steel cover and base can occur simultaneously. The material can be heated to approximately 975 degree centigrade to re-flow the glass and for simultaneous "Austenite Conditioning" (a process well known in the art, which does not need to be described in detail herein) of 17-7 PH stainless steel used for base 108 and cover 104. So-called "Austenite Conditioning" precipitates a significant amount of chromium carbide and prepares it for complete transformation to a hard martensitic phase. Stainless steel type 17-7 PH can thereafter be cooled to approximately −100 degree Fahrenheit and held 8 hours for complete transformation to a hard "Martensitic" phase for maximum strength and rigidity of the parts. In this condition, the parts are generally hard, but also brittle.

Stainless steel type 17-7 PH parts are now heated to 950 degree F. for RH 950 treatment, which stress relieves and improves toughness and corrosion resistance of the parts. The RH 950 treatment further improves strength of the parts by precipitation of the intermetallic nickel-aluminum compounds. The 950 F. treatment may also temper glass used in glass to metal sealing of the hermetically sealed sensor assembly. The last process generally involves gold plating the mounting pins 114 and 112 to facilitate wire bonding and soldering.

Finally, the pressure sensor 100 can be assembled and tested. The sensor assembly sequence generally involves the following steps: die attach, wire bond, cover attach, pre-load, weld, after weld test, stabilization bake, after stabilization bake test, PCB attach and chamber test. Cover 104 and base 108 are thus designed to provide an interference fit so that the pre-load process and hermetic seal process can be controlled with increasingly accuracy and efficiency. The cover to base design of the pressure sensor 100 also removes assembly tolerances from the tolerance stack because it features a flange-less design.

Figure 2:
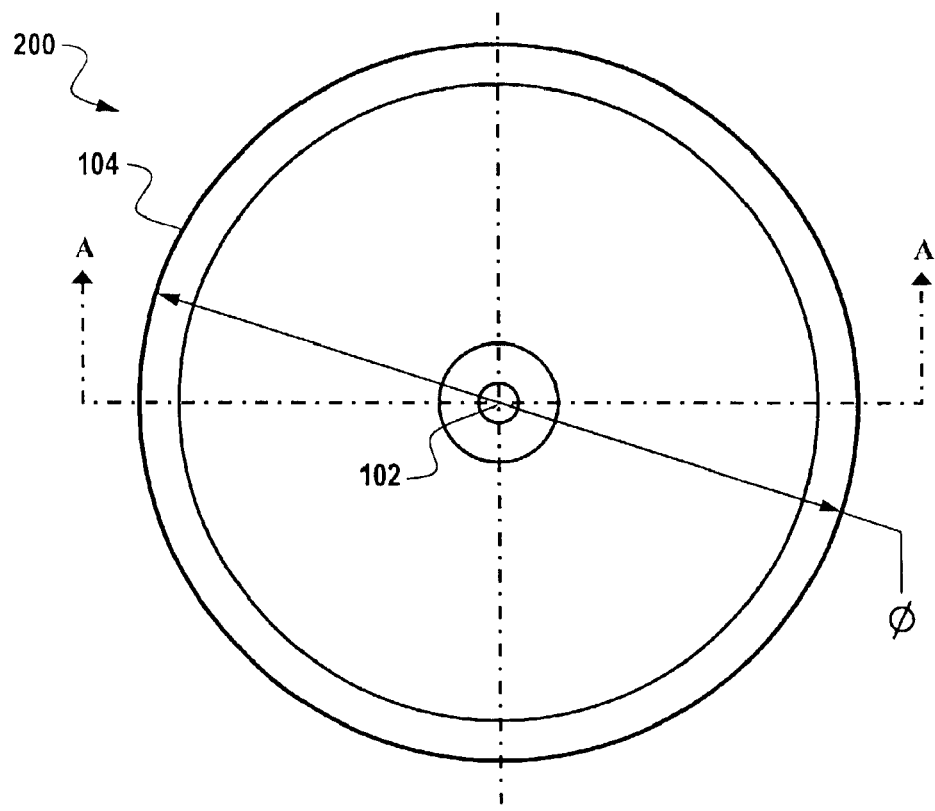
FIG. 2 illustrates a top sectional view of a cover, which can be implemented in accordance with a preferred embodiment of the present invention.
Figure 3:
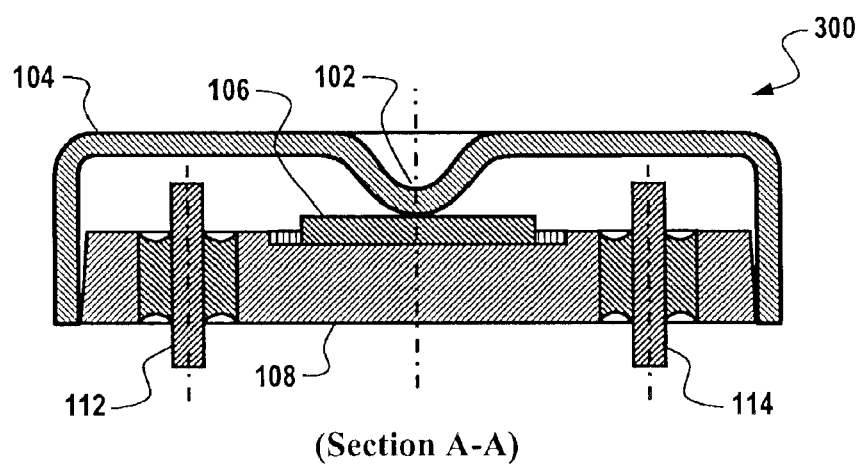
FIG. 3 illustrates a side sectional A—A view of cover depicted in FIG. 2, in which the cover is mounted over a base, including mounting pins thereof, in accordance with a preferred embodiment of the present invention.

FIG. 2 illustrates a top sectional view 200 of cover 104, which can be implemented in accordance with a preferred embodiment of the present invention. Note that in FIGS. 1, 2 and 3, like parts or elements are generally indicated by identical reference numerals. FIG. 3 illustrates a side sectional A—A view 300 of cover 104 depicted in FIG. 2, in which cover 104 is mounted over base 108, including mounting pins 112 and 114, in accordance with a preferred embodiment of the present invention. Cover 104 thus generally includes a dimple 104 formed at the center of cover 104. Quartz sense element 106 is depicted in FIG. 3 as located below proximate to dimple 102 and between mounting pins 112 and 114.

Figure 4:
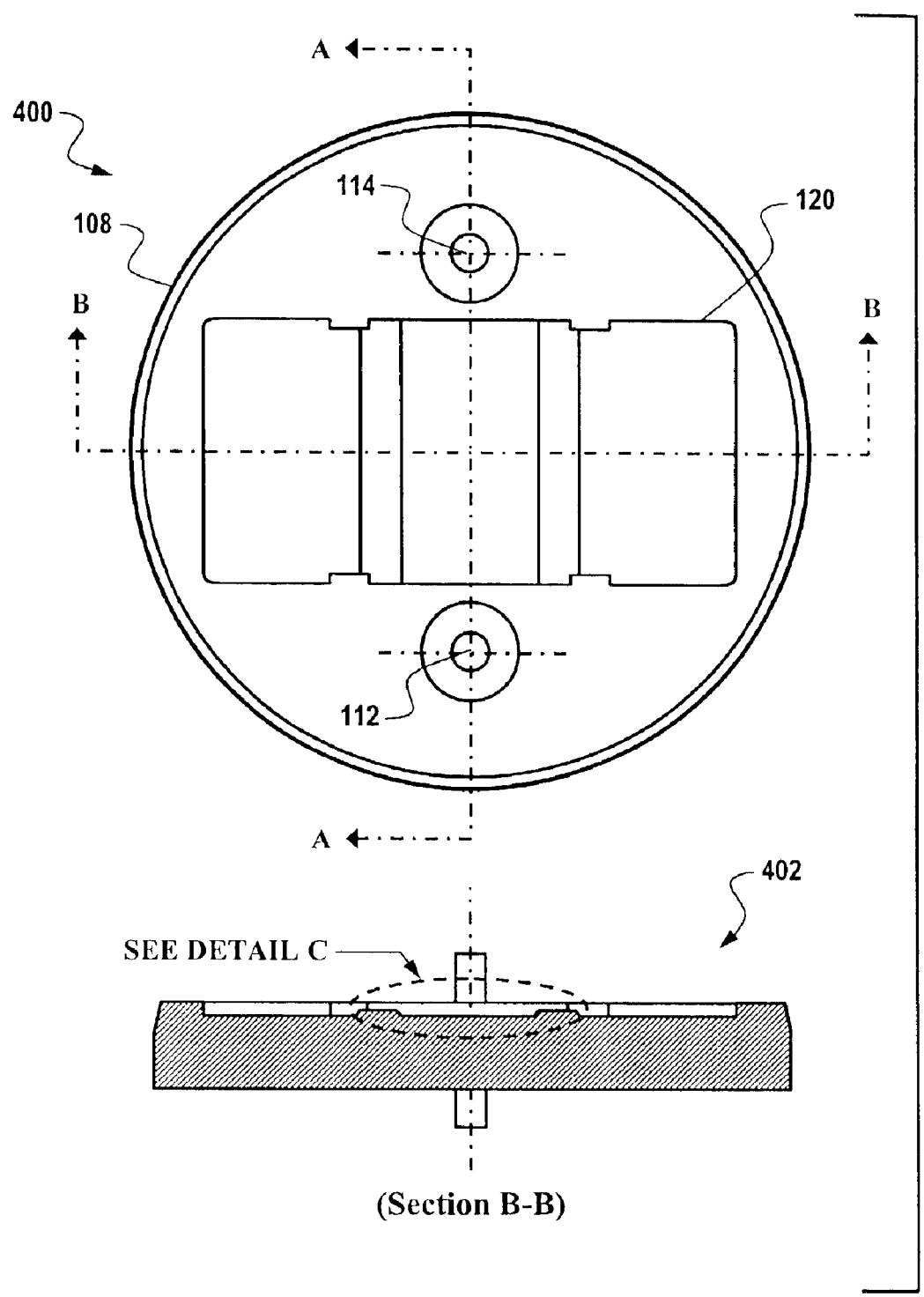
FIG. 4 illustrates top and side sectional views of a metal base, which can be implemented in accordance with a preferred embodiment of the present invention.
Figure 5:
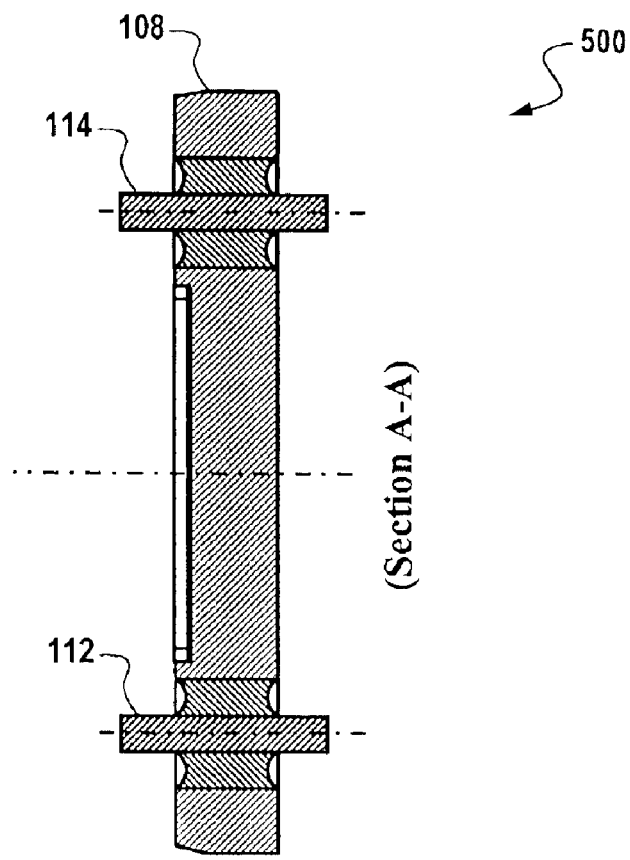
FIG. 5 illustrates a side sectional A—A view of the metal base depicted in FIG. 4, in accordance with a preferred embodiment of the present invention.
Figure 6:
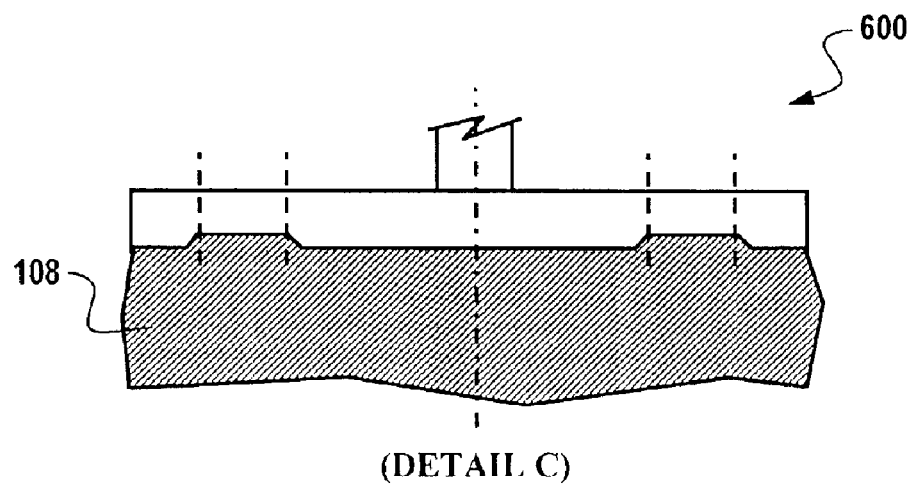
FIG. 6 illustrates a side sectional B—B view of the metal based depicted in FIG. 4, in accordance with a preferred embodiment of the present invention.

FIG. 4 illustrates respective top and side sectional views 400 and 402 of metal base 108, which can be implemented in accordance with a preferred embodiment of the present invention. FIG. 5 illustrates a side sectional A—A view 500 of the metal base 108 depicted in FIG. 4, in accordance with a preferred embodiment of the present invention. FIG. 6 illustrates a side sectional B—B view 600 of the metal base 108 based depicted in FIGS. 4 and 5, in accordance with a preferred embodiment of the present invention. Note that in FIGS. 1 to 6 herein, like or analogous parts or elements are generally indicated by identical reference numerals.

Figure 7:
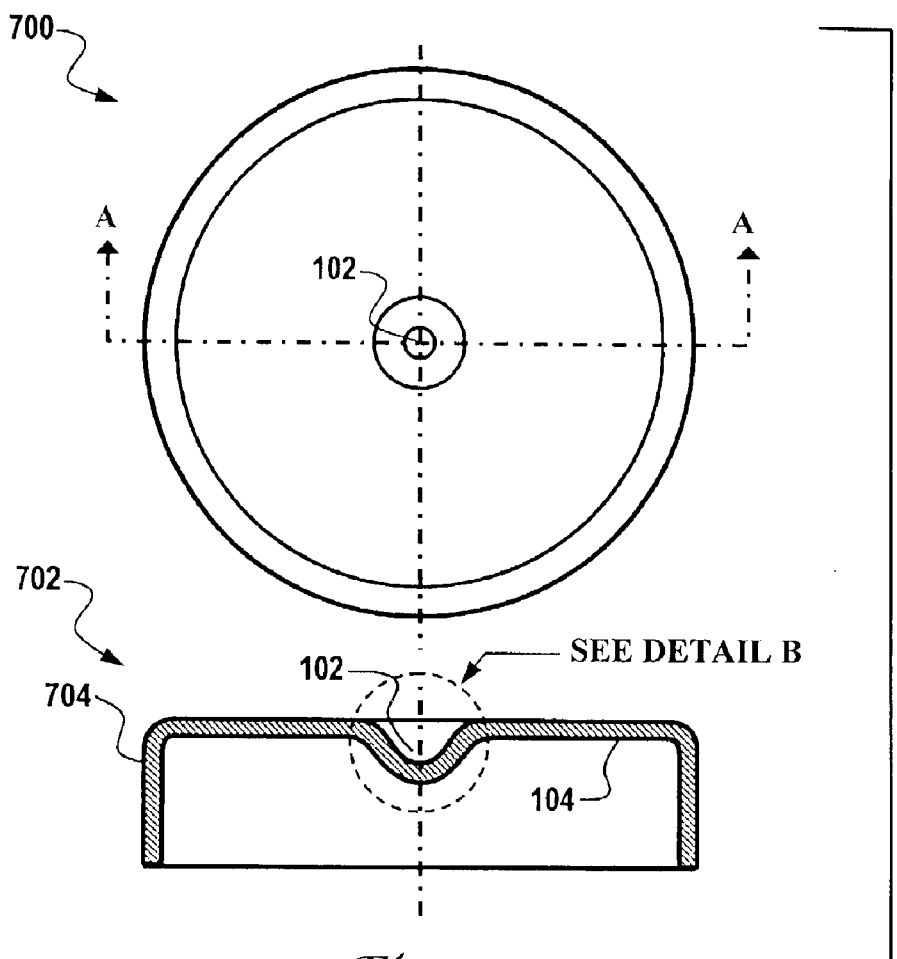
FIG. 7 illustrates sectional top and side views of a metal cover, which can be implemented in accordance with an alternative embodiment of the present invention.
Figure 8:
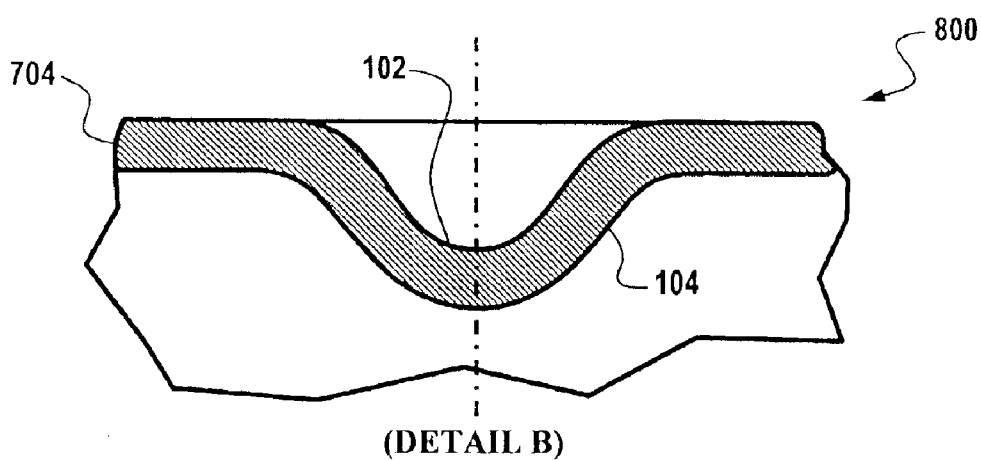
FIG. 8 illustrates a cut-away view of the metal cover depicted in FIG. 7, in accordance with an alternative embodiment of the present invention.

FIG. 7 illustrates sectional top and side views of cover 104, which can be implemented in accordance with an alternative embodiment of the present invention. FIG. 8 illustrates a cut-away view 800 of the metal cover 104 depicted in FIG. 7, in accordance with an alternative embodiment of the present invention. Note that in FIGS. 1 to 8 illustrated herein, like or analogous parts or elements are generally indicated by identical reference numerals. Thus, FIG. 7 illustrates a top view 700 of cover 104, including dimple 102 located at the center of cover 104. FIG. 7 also depicts a side view 702 of cover 104, including the location of dimple 102 and a wall 704 of cover 104. The cut-away view 800 of cover 104 depicted in FIG. 8 provides a close-up view of dimple 104, and wall 704 of cover 104.

The pressure sensor described herein can be utilized to measure pressure and temperature inside a vehicle tire (e.g., a passenger car tire or truck tire). The pressure sensor should preferably possess a low cross sectional area and thickness, and is generally light weight in configuration and compatible with processes used to mold truck tires and passenger car tires.

The pressure sensor base and cover materials preferably have a low-yield strength (e.g., approximately 40,000 psi) in the annealed condition so that the pressure sensor can be fabricated utilizing conventional processes such as machining and forming. The pressure sensor base and cover materials also have a high-yield strength (e.g., approximately 200,000 psi) in the hardened condition so that the pressure sensor possesses an enhanced elastic range and lower deformation in the end application.

The use of a 17-7 PH material as the sensor material for the base and cover is also preferred because the hardening process is also compatible with forming glass to metal seals in the base. The use of a 17-7 PH material for this sensor is an advantage of the present invention because the hardening process and the glass to metal sealing processes are combined. Another advantage of the present invention is that it provides enhanced sensor performance over other conventional pressures sensor designs.

Although not shown in FIGS. 1 to 8 herein, it can be appreciated that in a pressure sensor, a plurality of resonators (e.g., 3 resonators) can be connected in parallel to an antenna positioned inside the tire. A SAW pressure sensor implemented in accordance with the invention described herein, for example, can be interrogated by a short RF pulse at a frequency of approximately 434 MHz, which can excite natural oscillations of the resonators. The oscillations can be re-radiated by the antenna and received by an interrogation unit. Such an interrogation unit can analyze the spectrum of the oscillators, calculate two different frequencies and find the pressure and the temperature of the tire.

The present invention is therefore generally directed toward a pressure sensor apparatus, which can include a sensor element (e.g., quartz, piezoelectric, capacitive, etc.), a flexible sensor diaphragm in intimate contact with the sensor element at all pressure levels and temperatures, and a package base and a package cover for hermetically sealing the sensor element and the flexible sensor diaphragm within a hermetically sealed sensor package to provide pressure sensor data thereof.

Figure 9:
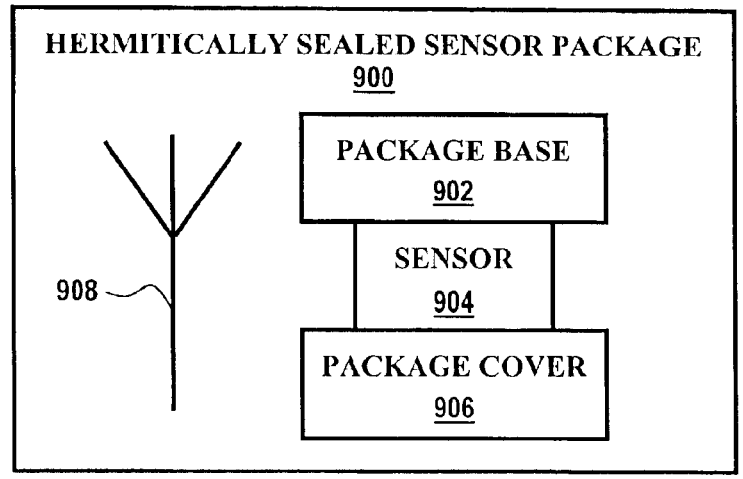
FIG. 9 illustrates a block diagram representative of a hermetically sealed sensor package, which can be implemented in accordance with an alternative embodiment of the present invention.
Figure 10:
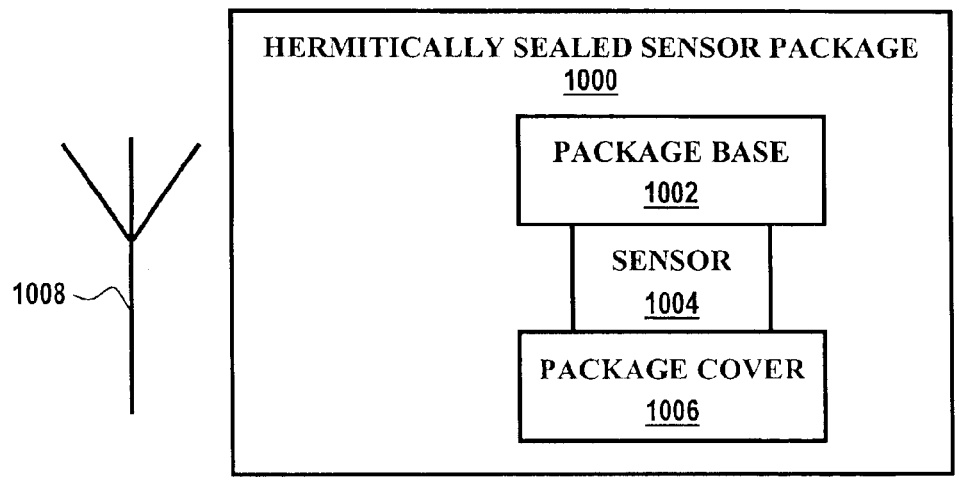
FIG. 10 illustrates a block diagram representative of a hermetically sealed sensor package, which can be implemented in accordance with a further alternative embodiment of the present invention.

The sensor element and the flexible sensor diaphragm can be pre-assembled within the hermetically sealed sensor package to shift an output frequency of the hermetically sealed sensor package a known amount to thereby ensure contact between the sensor element and the flexible sensor diaphragm. Additionally, a dimple can be formed in the center of the flexible sensor diaphragm, which in turn contacts, a flat surface of the sensor element. Also, an antenna can be implemented, which provides the pressure sensor data wirelessly from the hermetically sealed sensor package. FIGS. 9 and 10 illustrate how such an antenna can be associated with or integrated with such a hermetically sealed sensor package.

FIG. 9 illustrates a block diagram representative of a hermetically sealed sensor package 900, which can be implemented in accordance with an alternative embodiment of the present invention. FIG. 9 thus includes a sensor 904 which can be sealed by a package base 902 and a package cover 906. Sensor 908 can communicate with an antenna 908, which is maintained within hermetically sealed sensor package 900. FIG. 10 illustrates a block diagram representative of a hermetically sealed sensor package 1000, which can be implemented in accordance with a further alternative embodiment of the present invention.

FIG. 10 depicts a sensor 1004, which can be sealed by a package base 1002 and a package cover 1006. Sensor 1008 can communicate with an antenna 1008, which is located external to hermetically sealed sensor package 1000. Antennas 908 and 1008 can respectively wirelessly transmit data from hermetically sealed sensor packages 900 and 1000, wherein such data can be indicative of pressure and temperature data. Sensors 904 and 1004 can be implemented as, for example SAW (i.e., quartz), piezoelectric, or capacitive sensor elements.

Alternatively, a flex circuit interconnect can be located between the sensor element and the antenna. Additionally, a solder joint interconnect can be located between the flex circuit antenna. Alternatively, a printed circuit board (PCB) interconnect can be positioned between the sensor element and the antenna. A solder or solder joint can also be interconnected between the PCB and the antenna, depending upon desired design implementations. The package cover and the package base can be formed from stainless steel, such as, for example, a stainless steel 17-7 PH material. Finally, the hermetically sealed sensor package can be adapted for use in measuring pressure and temperature within a vehicle tire.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows. Having thus described the invention what is claimed is:

1. A pressure sensor apparatus, said apparatus comprising:
   a sensor element and a flexible sensor diaphragm in intimate contact with said sensor element at all pressure levels and temperatures; and
   a package base and a package cover for hermetically sealing said sensor element and said flexible sensor diaphragm within a hermetically sealed sensor package to provide pressure sensor data thereof, wherein said sensor element and said flexible sensor diaphragm are pre-assembled within said hermetically sealed sensor package.

2. The apparatus of claim 1 wherein said sensor element comprises a quartz sense element.

3. The apparatus of claim 1 wherein said sensor element comprises a silicon sense element.

4. The apparatus of claim 1 wherein said sensor element comprises a ceramic sense element.

5. The apparatus of claim 1 wherein said sensor element and said flexible sensor diaphragm are pre-assembled within said hermetically sealed sensor package to shift an output of said hermetically sealed sensor package a known amount to thereby ensure contact between said sensor element and said flexible sensor diaphragm.

6. The apparatus of claim 1 further comprising a flex circuit interconnect between said sensor element and said antenna.

7. The apparatus of claim 6 further comprising a solder joint interconnect between the flex circuit and said antenna.

8. The apparatus of claim 1 further comprising a printed circuit board (PCB) interconnect between said hermetically sealed sensor package and said antenna.

9. The apparatus of claim 8 further comprising a solder interconnected between said PCB and said antenna.

10. The apparatus of claim 1 wherein said package cover and said package base are each formed from a stainless steel material.

11. The apparatus of claim 10 wherein said stainless steel material comprises a 17-7 PH material.

12. The apparatus of claim 1 wherein said hermetically sealed sensor package comprises a shape that is adaptable for use in measuring pressure and temperature.

13. The apparatus of claim 12 wherein said small shape of said sealed sensor package is thin and circular.

14. The apparatus of claim 1 wherein said sensor base and said sensor cover are formed utilizing a stamping process.

15. A surface acoustic wave (SAW) pressure sensor apparatus, said apparatus comprising:
   a SAW sensor element, wherein said SAW sensor element comprises a quartz sense element;
   a flexible sensor diaphragm in intimate contact with said SAW sensor element at all pressure levels and temperatures;
   a package base and a package cover for hermetically sealing said SAW sensor element and said flexible sensor diaphragm within a hermetically sealed sensor package to provide pressure sensor data thereof, wherein said hermetically sealed sensor package is adapted for use in measuring pressure and temperature within a vehicle tire;
   a 17-7 PH material utilized to form said package cover and said package base; and
   wherein said SAW sensor element and said flexible sensor diaphragm are pre-assembled within said hermetically sealed sensor package to shift an output frequency of said hermetically sealed sensor package a known amount to thereby ensure contact between said sensor element and said flexible sensor diaphragm.

* * * * *